July 4, 1961
Z. D. RUBEN
2,990,862
PORTABLE POWER TABLE SAW
Filed Aug. 4, 1955
5 Sheets-Sheet 1
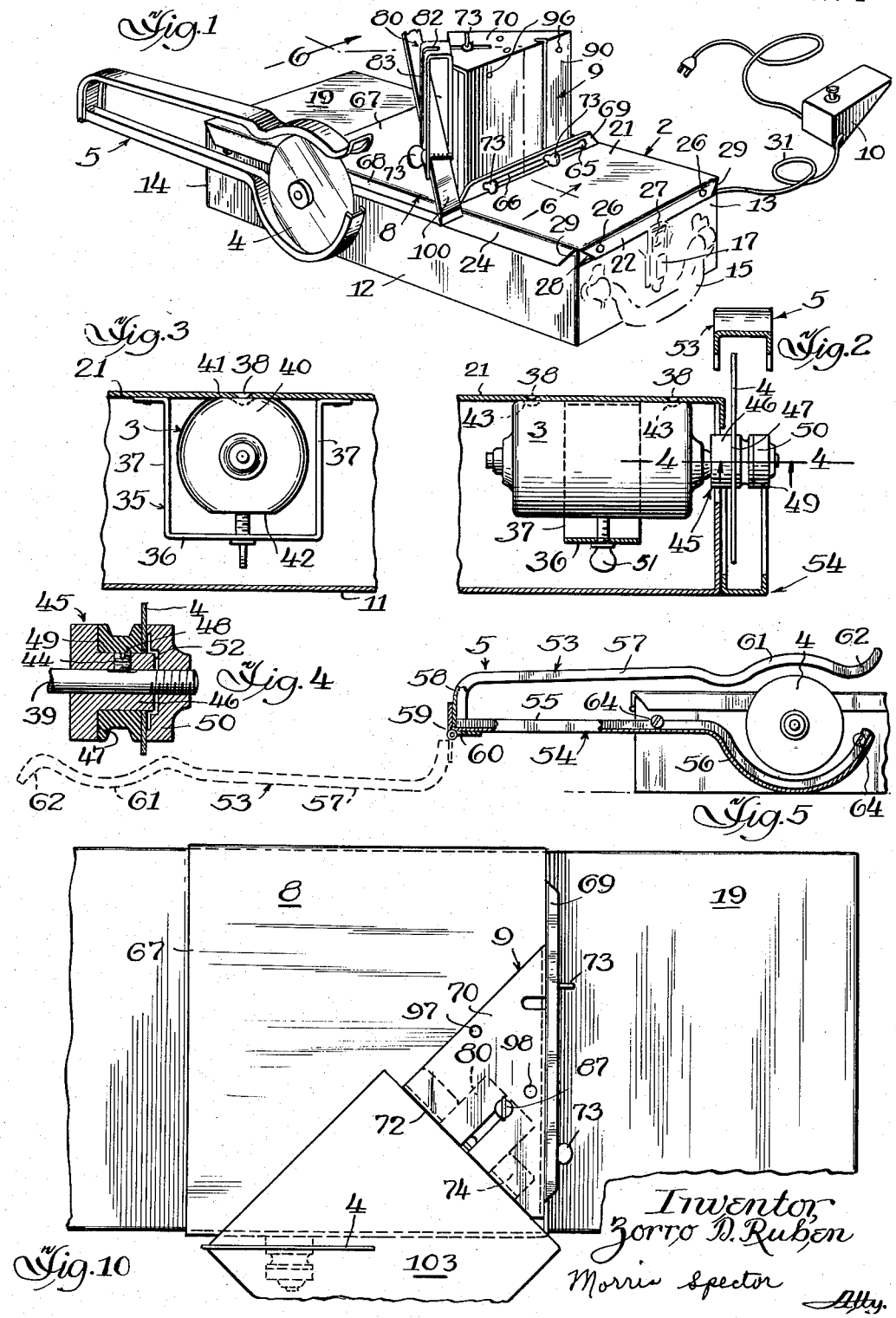

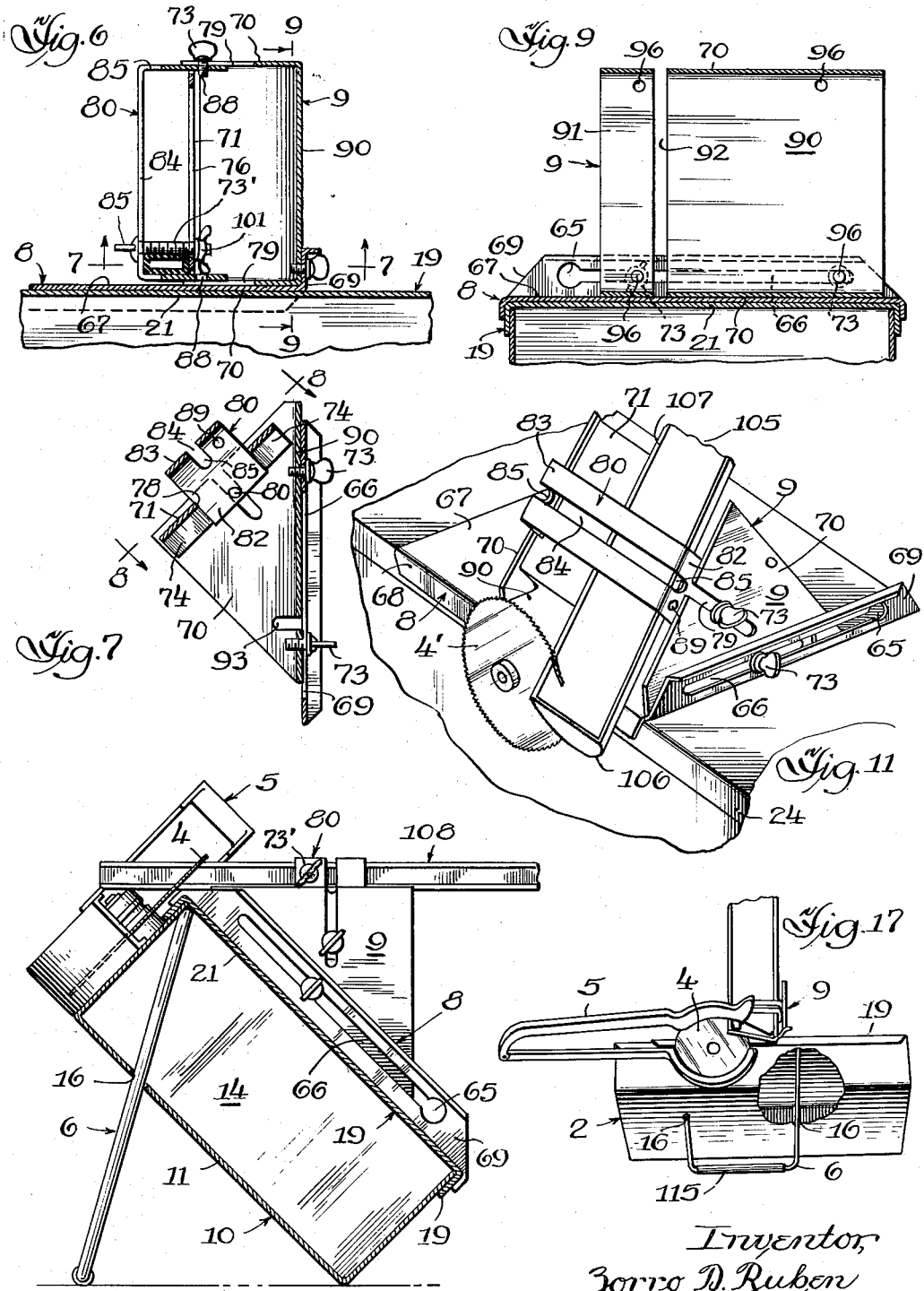

July 4, 1961     Z. D. RUBEN     2,990,862
PORTABLE POWER TABLE SAW

Filed Aug. 4, 1955     5 Sheets-Sheet 3

Inventor
Zorro D. Ruben
By Morris Spector Atty.

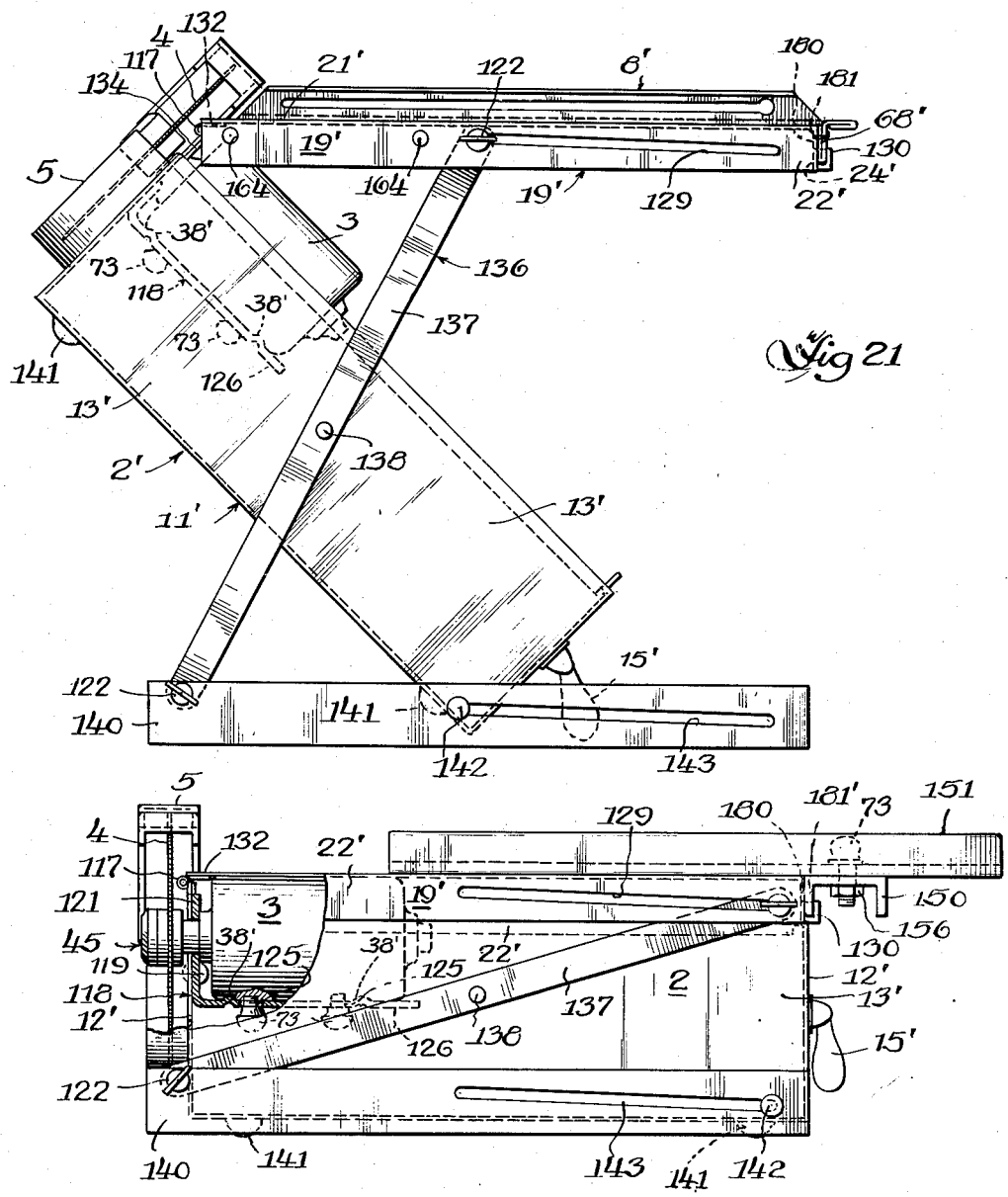

July 4, 1961

Z. D. RUBEN 2,990,862

PORTABLE POWER TABLE SAW

Filed Aug. 4, 1955

Inventor,
Zorro D. Ruben
Morris Spector Atty.

United States Patent Office 2,990,862
Patented July 4, 1961

2,990,862
PORTABLE POWER TABLE SAW
Zorro D. Ruben, 33 N. Central Ave., Chicago 44, Ill.
Filed Aug. 4, 1955, Ser. No. 526,504
33 Claims. (Cl. 144—285)

The present invention relates to portable motor driven tools.

In the building and repairing trades there are numerous instances where relatively accurate cutting operations are required at the situs of the work. For example, an artisan applying plastic or other tiling to a wall surface must often cut the tile squares or tile moldings to a precise size or angle to fit the pieces into a corner of a room. Accurate cutting operations are also required of the carpenter, as, for example, in the cutting of wood moldings. These cutting operations are difficult to accomplish quickly and accurately with ordinary portable hand tools.

It is an object of the present invention to provide a motor driven tool assembly capable of performing a large number of accurate cutting operations with equipment which is so compact and light in weight that it may be carried about easily by a single person. Another object of this invention is to provide a motor driven tool assembly wherein movable and auxiliary parts of the assembly are sufficiently small and compact to be stored in a relatively small portable storage box or carrying case, and where they may be quickly and easily assembled at the situs of the work into their working positions, utilizing the storage box as a mounting and guiding frame for the assembly.

It is another object of this invention to provide a portable motor driven tool assembly utilizing a support stand which enables gradual adjustment of the angle between the motor shaft and a work support surface for mitering or cutting at different angles. An ancillary object of the invention is to provide a portable machine tool apparatus as just described wherein the cover of a storage box constitutes a work support surface and the main body of the storage box constitutes a support for the motor.

It is important that the plane of a circular saw blade be maintained in alignment with the direction of relative movement between the work piece and the saw blade to prevent binding therebetween. Therefore, the axis of the motor shaft which drives the saw blade should be accurately positioned and maintained along a line at right angles to the direction of cut.

It is, accordingly, a still further object of this invention to provide a portable machine tool assembly which utilizes the cover of a storage box as a work support surface and the main body of the box as a support for the motor, and further wherein the cover is hinged to the box in a manner which minimizes relative movement or wobbling between the cover and the box body. In accordance with one aspect of the invention, the cover is hinged to the box body along substantially the entire length of the long side of the cover.

It is another object of this invention to provide a means for removably mounting a motor within a portable storage box wherein the motor shaft axis may be quickly and precisely aligned and maintained in the required position. Heretofore, motors have been secured in place by screws threading into the motor casing. This has often been found unsatisfactory due to the difficulty in accurately cutting and positioning tapped holes and to the looseness of the screw fit. In accordance with this invention, cooperating locating nipples and sockets formed in the motor casing and motor support accurately locate and position the motor.

In the portable machine tool apparatus disclosed in my co-pending application Serial No. 416,567, filed March 16, 1954, the saw blade is mounted outside of the storage box on a tool-receiving arbor carried by a motor mounted within the box. To minimize vibration of the saw blade, the saw blade is mounted as close to the motor bearing as possible. Since it is often necessary to cut very thin flexible materials, the saw blade must be mounted as close as possible to the side of the box. Furthermore, the diameters of the motors, gears or bearings dictate a minimum distance that the arbor shaft must be located below the work supporting surface. Where mitering operations are to be performed, it often becomes desirable to reposition the saw blade at a greater distance from the side of the box thereby obtaining a greater depth of cut within the limitations of the blade diameter. Accordingly, it is another one of the objects of this invention to provide a tool-receiving arbor which permits a saw blade to be mounted in at least two different axial positions on the motor arbor hub.

It is a still further object of the invention to provide portable machine tool apparatus as above described wherein the distance between the tool-receiving arbor axis and the plane of the work support surface may be selectively varied. This permits a variation in the depth of cut for a given size cutting blade.

It is a still further object of this invention to provide a portable machine tool apparatus of the type above described wherein the motor and cutting tool may be selectively moved with respect to a stationary work piece or held in position with respect to a movable work piece.

It is another object of the invention to provide a portable machine tool assembly with work guiding and work supporting devices which enable an operator to perform a large number of accurate machining operations on a variety of work pieces.

It is another object of this invention to provide a miter fixture for a portable machine tool assembly which may be mounted in a number of different positions on a work support member for performing different mitering operations. A still further object of this invention is to provide a clamping piece mountable on the miter fixture for clamping variously sized and shaped work pieces on the miter fixture. It is an ancillary object of the invention to provide a clamping piece which may be removed from the miter fixture and mounted on a work support to constitute a side gauge or, alternatively, may be mounted in a different position on the miter fixture to act as a back support.

It is still another object of this invention to provide a miter fixture which is designed to support a flanged work piece, such as flanged cove base.

It is a further object of this invention to provide portable machine tool apparatus utilizing a storage box as a mounting frame for the components of the machine tool, and further, wherein a carriage plate having a depending guide flange is provided which may be guided by the sides of the box and which, alternatively, may be inverted and anchored to the box top so that the guide flange becomes a stationary rip fence.

It is another object of this invention to provide an angular work support which can also form a back support with the same angle with respect to the tool axis of rotation.

It is another object of this invention to provide a storage box forming a mounting frame for a machine tool assembly, and wherein the cover is provided with a guide channel for guiding a carriage plate thereon.

It is a still further object of the invention to provide a portable machine tool apparatus as above described wherein a guard is provided which is mountable on the side of the storage box. It is an ancillary object of the invention to provide a guard for a portable machine tool assembly wherein the guard comprises two pieces which are hinged together at one end and are spaced apart at the other end to receive work pieces of any thickness between the cutting wheel and the guard.

It is a further object of this invention to provide a portable machine tool assembly as above described wherein the work support surface or cover is hinged to the main body of the box, which then supports the motor and blade arbor, along the side from which the latter projects and in which, as the cutting angle is varied by opening the cover, cooperating box supports extend in such manner as to equally counter-tilt the box. In this fashion, the work support remains level at all cutting angles.

It is a still further object of this invention to provide a portable machine tool assembly as above described wherein there is provided an extension table which may be mounted on the outside of the storage box to provide support for the severed work part of a piece.

It is another object of the invention to provide machine tool apparatus as above described where all attachments to the storage box fit within the box at the same time and are light in weight so that a single operator can carry the assembly with ease.

Other objects, advantages and features of the invention will become apparent upon making reference to the specification to follow taken in conjunction with the drawings wherein:

FIG. 1 is a perspective view of one form of the invention showing a miter fixture, clamping a metal frame piece, in position to make a miter cut;

FIG. 2 is a fragmentary transverse section through the motor axis with the motor, arbor and blade in view showing the mounting for a motor within the storage box;

FIG. 3 is a fragmentary section and view of the motor mounting as seen at right angles to the view of FIG. 2;

FIG. 4 is a section through the tool-receiving arbor carried by the motor shaft and shows an alternate position of the saw blade;

FIG. 5 is a view of a tool guard, in partial section, mounted on the side of the storage box;

FIG. 6 is a vertical section through the miter fixture of FIG. 1, taken along section line 6—6;

FIG. 7 is a section through the miter fixture, with the metal frame piece removed, taken along section line 7—7 of FIG. 6;

FIG. 9 (Sheet 2) is a section through the miter fixture, taken along section line 9—9 of FIG. 6;

FIG. 10 (Sheet 1) is a fragmentary plan view of the tool assembly of the invention where the miter fixture supports a square tile piece in position for a diagonal cut;

FIG. 11 (Sheet 2) is a perspective view of the tool assembly with the miter fixture arranged to support a plastic molding piece during a mitering operation;

FIG. 17 (Sheet 2) is a perspective view of the portable tool assembly of the invention supported on a tilt stand so that the work support wall of the miter fixture is in a horizontal plane;

FIG. 18 (Sheet 2) is an enlarged end view, partially in section, with the motor removed, of the portable tool assembly arrangement of FIG. 17;

FIG. 19 (Sheet 4) shows an end view, partially in section, of a modified form of tool box construction;

FIG. 21 (Sheet 4) is an end elevation showing the tool box of FIG. 19 in an alternate position for a mitering operation and showing a modified form of work support from that shown in FIG. 19;

Figure 12:
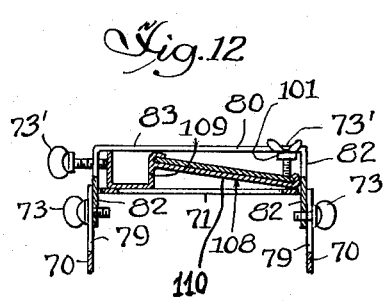
FIG. 12 is a transverse section through a portion of the miter fixture, showing an irregularly shaped piece clamped in place on the fixture.

The present invention provides a completely compact and portable machine tool assembly having unique work-guiding and tool-aligning devices which are mountable upon a carrying case or storage box which acts as a support frame for the various elements making up the machine tool. All of the elements are sized to fit simultaneously within the storage box when not in use, and are designed to be quickly and easily mounted upon the storage box in a number of different ways to permit a large variation in the machining operations performed thereby. Further, the attachments are designed for use with work pieces of practically any shape.

Reference should now be made to the drawings where the same reference characters indicate the same elements throughout.

In the form of the invention illustrated in FIGS. 1 through 18, the components making up the portable machine tool assembly include a portable storage box or carrying case 2, a motor 3 mounted within the box, a rotary saw blade 4 secured to the motor shaft outside of the box, a tool guard 5, a tilt stand 6 (FIGS. 17 and 18), a carriage plate 8 slidably mounted upon the storage box, a miter fixture 9, and a foot switch 10 which controls the energization of the motor 3. All of the aforementioned components are designed and sized to fit within the storage box when not in use.

A detailed construction of the various components above mentioned will now be described, one at a time. The various types of machining operations which can be performed will then be explained.

*Storage box*

The storage box carrying case includes an open-top, rectangular body having a bottom 11, longitudinal walls 12—12 and end walls 13 and 14. The end wall 13 has attached thereto a handle 15 and a latch lock 17. The top of the end wall 13 is located a small distance below the top of the longitudinal walls 12—12. The bottom 11 has holes 16—16 spaced to receive the legs of the tilt stand 6 (FIGS. 17 and 18).

The storage box has a cover 19 with a flat rectangular top 21 from which depends end flanges 22 and 23 (FIGS. 1 and 13) and longitudinal flanges 24—24.

The end flange 22 has a pair of tapped holes 26—26 and a hooked extension 27 adapted to latch with the lock 17 to hold the cover in its closed position. The side edges of the end flange 22 are cut away as at 28 (FIG. 1) to provide openings 29—29. When the cover is closed, one of these openings provides clearance for an electric cord 31 interconnecting the foot switch 10 with the motor 3 within the storage box. The other end flange 23 carries the hinge eyes 32 of a hinge assembly 33 (see FIG. 13).

Motor mounting

The motor 3 is secured to the cover 19 by a generally U-shaped mounting frame 35 (FIGS. 3–4). The frame has a bottom wall 36 and side walls 37—37 aligned parallel to the short dimension of the cover. The side walls of the frame terminate in flanges which are secured in any desirable manner to the bottom face of the cover 19 as by spot welding. The motor 3 is mounted within a space provided between the mounting frame and the cover. One of the important aspects of the invention relates to the means for precisely orientating the axis of the motor shaft at right angles to the length of the cover. To this end, a pair of downwardly extending locating nipples 38—38 are stamped in the top of the cover 19 along a line at right angles to the long dimension of the cover. The motor casing 40, which has flattened upper and lower faces 41 and 42, parallel to the shaft 38, is provided with sockets 43—43 designed to snugly receive the locating nipples 38—38. The motor is clamped in place against the cover by a screw 51 which threads into a tapped hole in the bottom wall 36 of the mounting frame. The top of the screw bears against the flat bottom of the motor casing to hold the motor casing against the cover of the storage box.

Accurate alignment of the motor axis at right angles to the length of the cover is necessary for precise work and becomes especially important when motor power is at a premium due to requirements for portability.

High speed motors presently available provide the highest horse power output per given size of motor. In one example, a universal sewing machine type motor was utilized having a no load speed of approximately 16,000 r.p.m. A certain amount of shaft vibration can be expected and such vibration, coupled with a small but significant amount of misalignment between the motor axis and the short dimension of the storage box, could create undesirable binding between the saw blade 4 and the work piece being cut. Due to the difficulty of precisely locating and orientating the tapped holes, the above-mentioned method of mounting and locating the motor has been found to be much more satisfactory than the simple expedient of attaching the motor to the storage box by screws threading into the motor casing.

The motor mounting just described is so constructed that the motor may be quickly and easily removed from or inserted into the mounting frame 35. Due to this fact, the operator may readily detach the motor from the cover and use the same as a hand-held tool. For example, a buffing wheel may be attached to the motor shaft and the motor manually applied to the desired work surface.

Tool-receiving arbor

In the forms of invention illustrated herein the cutting blade is mounted on an arbor assembly 45 centered and keyed directly on the armature shaft of the motor 3. This is not always the case as it is necessary in the larger units to provide a gear reduction to drive the cutting blade at a speed slower than that at the armature. In such event, of course, the power take-off shaft can be offset from the central axis of the motor and thus be located closer to the outer surface.

Regardless of the type of power take-off, it is necessary that the axis of the arbor be spaced below that of the work-supporting surface even if the arbor shaft is offset from the motor axis as by gearing or by a belt and pulley drive. The diameters of bearings, gears or pulleys and arbors determine the minimum dimension referred to.

When equipment is desired only to cut thin materials, say on the order of one inch or less, it becomes desirable, in the interest of portability and cost, to mount the blade directly on the motor shaft. An immediate power advantage is gained as even the simplest gearing or pulley arrangement would watte a good deal of the motor power output in frictional losses.

However, some depth of square cut for a given blade diameter must be sacrificed as the motor diameter (or height) now dictates the distance between the blade center and the work-supporting surface. It is not, however, necessary to sacrifice any depth for a miter cut. This is possible because the cutting of miters is done over the edge of the box. The saw blade 4 must be positioned far enough away from the edge as shown by the dotted position in FIG. 13, in order to clear the nut 50 which locks the saw blade in its position.

A relatively distant position of the blade from the edge of the box is not usually objectionable for mitering as even thin flexible materials are fairly rigid when formed in molding shapes. However, such materials in the form of tiles or sheets, for example, would be difficult to handle if the blade were not then close to the edge of the box.

The motor shaft 39 therefore carries a tool-receiving arbor assembly 45 which permits the mounting of the saw blade 4 in either one of two axial positions. The arbor assembly includes the arbor piece 46 which is fixed to the motor shaft as by means of a set screw 44. The arbor has a radial shoulder 47 from which extends a reduced cylindrical hub 48. Slidable over the arbor hub is a spacer piece 49 having flat, opposite axial end faces. The combined axial lengths of the saw blade 4 and the spacer piece 49 are less than the axial length of the cylindrical arbor hub 48. Therefore, the saw blade 4 may be positioned either between the spacer piece and the aforementioned arbor shoulder 47 where it is closest to the motor 3, as shown in FIG. 2, or it may be placed on the arbor hub on the outside of the spacer piece 49 as shown in FIG. 4. In either case, the assembly of the spacer piece 48 and the saw blade 4 is held securely on the arbor hub by a knurled nut 50 which threads onto the shaft 39 or a reduced threaded end of the arbor hub in a direction such that the rotation of the saw blade tends to tighten the nut. The nut 48 has a central recess 52 which is sized to receive the end of the arbor hub. The knurling on the nut 50 has been found useful in grinding away thermoplastic material and is especially useful in forming holes and curves of any desirable shape in plastic tiling.

Tool guard

The machine tool of the invention is capable of cutting many different materials. By varying the saw blade 4, rigid or flexible plastic materials, aluminum, wood, and light gauged sheet steel may be cut. When cutting metal, it is desirable to provide a guard to prevent flying chips from injuring the operator. The use of the conventional types of guards with the apparatus above described has been found unsatisfactory. The guard 5 of the present invention is comprised of a pair of channel-shaped metal pieces 53 and 54, one above the other. The bottom piece 54 has a straight horizontal portion 55 which merges with a curved end 56 which curves around the bottom of the saw blade 4. The upper piece 53 has a straight intermediate portion 57 which has a downwardly curving end 58 which is hinged to the end of the straight portion 55 of the bottom channel piece by a hinge 59. The bottom channel piece 54 fits between the flanges of the upper channel piece 53, and the pivotal movement of the two pieces toward one another is limited by the engagement of the bottom of the curved end of the upper channel piece with the hinge plate 60 secured to the bottom channel piece 54.

The distal end of the upper channel piece is curved to fit around the upper part of the saw blade 4 and terminates in an upwardly curving camming lip 62. The straight, spaced apart portions 55 and 57 of the channel pieces are relatively long and provided clearance for a work piece moved across the saw blade 4. When a relatively thick work piece is cut by the saw blade 4, the upper channel piece is automatically cammed out of the way as the camming lip 62 is engaged by the work piece.

To mount the guard to the side of the storage box, spaced, chamfered notches are cut into one of the flanges of the bottom channel piece. These notches receive the projecting heads of flat-head screws 64—64 which are bolted through holes in the storage box body 10. The guard is slightly stretched to line up notches and screw heads and clamped to the box by slipping the former under the latter.

When the guard is not desired, the upper guard piece 53 may be readily pivoted out of the way, as shown in dotted lines in FIG. 5, or the guard removed from the box 2. The overall dimensions of the guard are such that it may fit within the storage box when not in use.

Carriage plate

The cover 19 of the storage box forms a slide surface for the carriage plate 8. The carriage plate 18 has a flat, rectangular work support surface 67 from which extend depending guide flanges 68—68 which straddle the parallel longitudinal flanges 24—24 of the storage box cover 19. The cover flanges 24—24 thus guide the carriage plate longitudinaly of the storage box. Clearance is provided between the saw blade 4 in its innermost position of FIG. 2 and the adjacent cover flange 24 so that the carriage plate may be moved the entire length of the storage box cover.

Extending upward from the work support surface 67 at right angles to the guide flanges 68—68 is a mounting flange 69. The mounting flange has a longitudinal slot 66 therein which terminates at one end in an enlarged circular opening 65. The slot 66 is used primarily in conjunction with a miter fixture 9, to be described, and provides a means for readily adjusting and fixing the position of the miter fixture on the carriage plate. The enlarged slot end 65 provides clearance for the passage of the head of a shouldered thumb screw, such as 73, which thumb screw threads into tapped holes in the miter fixture and secures the same in place as the head of the screw bears tightly against the walls of the mounting flange straddling the slot 66. Both the guide flanges 68—68 and the mounting flange 69 may perform additional functions to be later described.

The carriage plate, as are the other attachments of the machine tool, is sized to fit within the storage box. Accordingly, the overall distance between the mounting flange 69 and the opposite edge of the plate is less than the spacing between the longitudinal walls in the storage box body.

Miter Fixture

The miter fixture 9 which is mountable upon the carriage plate is designed to perform numerous mitering operations on work pieces of various sizes and shapes. In the preferred embodiment illustrated in the drawings, the fixture includes a pair of spaced, parallel, generally triangular walls 70—70. The triangular walls have the general outline of a right angle isosceles triangle. A rectangular bridging wall 71 (see FIG. 8) extends between the triangular walls 70—70 in a plane recessed from the extending parallel to the edges 72—72 of the triangular walls. The bridging wall 71 has a mounting flange or tab 74 projecting at right angles thereto at each end thereof, and the tabs are secured to the inner surfaces of the triangular walls in any suitable manner, as by spot welding. The bridging wall 71 has a slot 76 extending at right angles to the triangular fixture walls 70—70 and has a pair of rectangular notches formed in the end tabs thereof which define guide slots 78—78 between the bridging wall 71 and the triangular walls 70—70. The fixture side walls 70—70 have slots 79—79 whose longitudinal axes are at right angles to and intersect the longitudinal axes of the bridging wall slot 76. The slots 79—79 and 76 are centrally located with respect to the guide slots 78—78.

Figure 13:
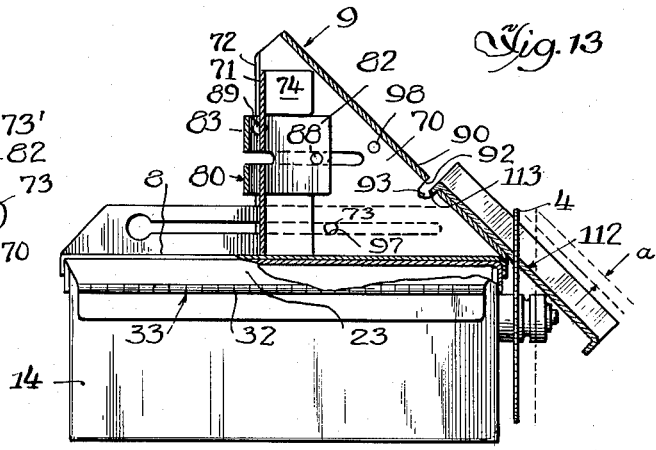
FIG. 13 is a rear end view of the tool assembly showing the miter fixture in section and supporting a flanged cove base in position for a mitering operation.
Figure 14:
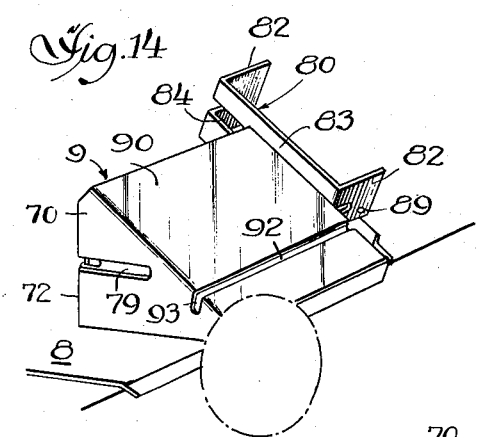
FIG. 14 is a perspective view of the miter fixture with the clamping channel removed from its normal position in the fixture and mounted thereon instead to form a back support.
Figure 15:
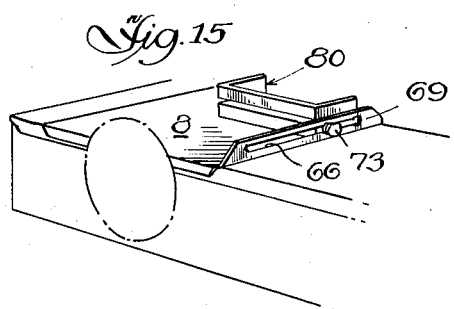
FIG. 15 is a perspective view of the tool assembly showing the clamping channel secured to the carriage plate mounting flange in a position where the channel acts as a side gauge.
Figure 8:
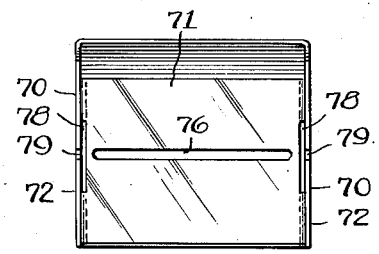
FIG. 8 (Sheet 1) is a view of the miter fixture with the clamping channel removed, as viewed along plane 8—8 in FIG. 7.

A clamping channel piece 80 is provided having flanges 82—82 which are extendible into the guide slots 78—78. The channel piece has a web 83 which has a central slot 84 extending the complete length thereof. The channel piece flanges 82—82 have shallow slots 85—85 which form extensions of the web slot 84. When the channel piece flanges 82—82 are in place within the guide slots 78—78, the longitudinal web slot 84 is in registry with the bridging wall slot 76, as shown in FIGS. 7, 8 and 13.

The channel piece may be locked in any one of a number of adjusted positions thereof on the miter fixture by shouldered thumb screws 73 having shanks extendible through the slots 79—79 of the triangular fixture walls 70—70. The screw shanks are threadable into tapped holes 88—88 in the channel piece flanges 82. The flanges 82 have additional tapped holes 89—89 located on opposite sides of the flange slots 85—85. These holes are respectively located to be in registry with the carriage plate flange slot 66, when the channel piece is laid respectively on its opposite side edges.

Extending between the hypotenuse of the right triangles formed by the fixture walls 70—70 is a rectangular bridging wall 90 formed integrally with the latter walls. The bridging wall 90 is at an angle of 45° to the first-mentioned bridging wall 71. Thus, when the miter fixture is supported on either of the bridging walls 71 or 90, the other bridging wall will make a 45° angle with respect to the plane of support. The second-mentioned bridging wall 90 has a transverse slot 92 extending at right angles to the fixture walls 70—70 and a continuation of the latter slot is formed in the walls 70—70 at 93—93 (FIGS. 7 and 13). A pair of tapped holes 96—96 is formed in the bridging wall 90 in alignment with and contiguous to each longitudinal edge of the bridging wall 90. These tapped holes serve to receive shouldered screws passing through the mounting flange slot of the carriage plate to anchor the miter fixture in two positions thereof to be described. One of the triangular fixture walls 70 includes tapped holes 97—98 (FIG. 13) located respectively in the vicinities of intersecting edges of the latter wall. These tapped holes are adapted to receive shouldered screws passing through the carriage plate mounting flange slot 66 to anchor the miter fixture in two other positions thereof to be described.

Uses of the machine tool apparatus

Refer now to FIG. 1 which shows the machine tool apparatus of the invention performing a miter cut on a metal frame piece 100. For this application, the metal guard 5 is clamped in place to the side of the storage box and the carriage plate is placed in position on the top of the cover with the longitudinal flanges 68—68 thereof straddling the longitudinal cover flanges 24—24, and the carriage plate mounting flange 69 located at the side of the carriage plate remote from the cutting wheel 4. The miter fixture 9 is placed on top of the carriage plate with one of the triangular fixture walls 70 face down and the bridging wall 90 against the mounting flange 69. In this position, a pair of tapped holes 96—96 in the wall 90 are in registry with the slot 66 in the flange 69. A shouldered thumb screw 73 is threaded into one of the latter tapped holes from the outside of the flange 69, and tightened to clamp the miter fixture in the desired position on the carriage plate. Alternatively, the screw 73 can first be loosely threaded into the fixture holes 96 before the fixture is applied to the carriage plate and the head of the screw then fastened to the carriage plate flange 69 by passing the screw head through the enlarged slot end 65 of the flange. If desired for additional security a second screw 73 may be tightened into the additional tapped hole 96.

The work piece 100 is then slipped in between the web of the channel piece 80 and the bridging wall 71 wherein the channel piece is loosely held against the work piece. A thumb screw 73 passing through the fixture wall slot 79 and threading into the adjacent tapped hole 88 in the clamping channel flange 82 is tightened to lock the channel piece in place. The lightly held work piece is then seated on the bottom flange of the channel piece, and a relatively long thumb screw 73' is then passed through the channel piece slot 84 (see FIG. 6) and through the slot 76 in the bridging wall 71 of the miter fixture and positioned on top of the work piece. A wing nut 101 is then threaded and tightened over the shank of the screw 73' to securely clamp the work piece on the miter fixture.

To operate the machine tool, the foot pedal 10 is depressed which initiates rotation of the saw blade 4, whereupon the operator pushes the miter fixture forward to bring the work piece thereon into contact with the cutting wheel 4.

To obtain a complementary miter cut of the opposite inclination, the miter fixture is turned around so that the other pair of tapped holes 96—96 in the bridging wall 90 are in registry with the mounting flange slot 66. In such case, the bridging wall 71 which is the back support for the work piece angles toward, rather than away from the cutting wheel 4 as shown in FIG. 1.

Where a right angle transverse cut is desired, the miter fixture is removed from the carriage plate and the work piece is supported against the mounting flange 69 of the carriage plate. The work piece may be manually held in position on the carriage plate as it is fed to the saw blade 4.

Where it is desired to obtain a diagonal cut in a square tile piece 103 (see FIG. 10), the miter fixture is positioned in the same manner as shown in FIG. 1 except that the channel piece 80 is locked in its fully retracted position where the web 83 thereof is recessed with respect to the contiguous edge of the triangular fixture walls 70—70. The tile piece 103 is then braced against the last-mentioned edge of the then lower fixture wall 70. The tile piece is manually held in position on the carriage plate and against the edge of the miter fixture wall 70 with the diagonal line to be cut in alignment with the edge of the saw blade 4. The carriage plate is then fed toward the cutting wheel to bring the tile in contact with the saw blade.

In cutting plastic tile, it is not usually necessary to utilize the guard 5. It may either be removed from the storage box, or else the upper section 57 thereof may be pivoted out of the way into the position shown in dotted lines in FIG. 5, as would be done if long lengths of work were required to be cut.

Refer now to FIG. 11 which shows the arrangement of the miter fixture 9 when performing a miter cut on a rounded plastic molding 105. The molding 105 there shown has a rounded face 106 on one side and a flat rim 107 on the other side. The miter fixture 9 is positioned on the carriage plate 8 with the bridging wall 90 face down and the bridging wall 71 facing the side of the storage box containing a saw blade 4' suitable for cutting plastic tile. A thumb screw 73 may then be passed through the mounting flange slot 66 and threaded into the tapped hole 98 (FIG. 13) in the fixture wall 70. The plastic molding piece 105 is then clamped in place between the channel piece 80 and the fixture wall 71. The molding piece 105 may be orientated with the flat edge 107 thereof either resting against the flat bridging wall 71 or the web 83 of the channel piece. Without the use of the channel piece such as 80 as a clamp, to maintain the flat rim 107 of the molding piece parallel to the wall 71, it would be extremely difficult to maintain the rounded molding piece 105 in proper position against the saw blade during a mitering operation. A complementary miter cut may be obtained by reversing the position of the molding piece on the miter fixture and again clamping it in place with the channel piece 80.

The flexibility of the miter fixture of the invention can be better appreciated by referring to FIG. 12 which shows an irregularly shaped piece 108 clamped on the miter fixture. The piece 108 in transverse section has a channel 109 and an inclined portion 110 extending from one of the flanges of the channel. The channel 109 of the irregular work piece 108 is clamped in place between the web of the channel piece and the fixture bridging wall 71 utilizing shoulder screws 73—73. The inclined portion 110 of the work piece is held in place by a long shouldered screw 73' passed through the slot 84 of the channel piece and threaded through a wing nut 101 positioned adjacent to the bottom face of the web 83 of the channel piece. The screw 83' is threaded through the nut until the bottom of the screw presses tightly against the top of the inclined portion 108 of the work piece. The irregular shape of the work piece also requires a lateral clamping action for best results, and this is obtained by means of a long screw 73' which threads through the tapped hole 89 in one of the channel piece flanges 82 so that the end of the screw bears against the side of the channel 109 and presses the work piece against the other channel piece flange 82.

Refer now to FIG. 13 which shows a cove base piece 112 flanged on two sides (and the leading end, not shown) supported from the miter fixture 9 in position for a miter cut. The miter fixture 9 is now positioned on the carriage plate with the bridging wall 90 facing the side of the storage box containing the saw blade 4. The flange 113 of the cove base piece 112 is placed within the slot 92 of the bridging wall 90 of the miter fixture. The slots 93—93 in the triangular walls 70—70 of the miter fixture permits the extension of a flange of a cove base piece which is substantially wider than the bridging wall 71. The slots 93 must, of course, be at least as large as the depth of the cove base flange 113. The cove base piece 112 may then be held manually in position on the miter fixture as the cove base is fed into the cutting wheel 4.

In the position shown in FIG. 13 the coved section of the base piece 112 is farthermost from the blade. A side flange is held against one edge of the slot 92 while the flange opposite the cove (not visible) is held against a wall 70 of the miter fixture. Thus the piece 112 is properly aligned and supported for cutting and its under face is solidly maintained at the proper angle by full support against the bridging wall 90.

To obtain the complementary miter cut to that shown in FIG. 13, the cove section is placed closest to the blade and the flange opposite is placed against the other wall 70 of the miter fixture.

The dotted line indicating the alternate position of the blade in FIG. 13 serves to point out, by the distance marked "a," the greater effective miter depth of cut permitted by the arrangement detailed in FIG. 4.

Because the channel piece 80 is removable from the miter fixture, it may serve numerous other purposes. For example, referring to FIG. 14, the channel piece may be used as a back rest or back stop where the bridging wall 90 is used as the work support surface. The web 83 of the channel piece in placed flush against one of the triangular fixture side walls 70, and is locked in the position shown in FIG. 14 by a thumb screw passing through the web slot 84 and threading into the tapped hole 98 (FIG. 13) in the last-mentioned side wall 70.

The channel piece 80 may also be used as a side gauge where an ordinary transverse cut is to be made. Thus, referring to FIG. 15, the channel piece may be placed on its side on the carriage plate and anchored by passing a screw 73 through the slot 66 of the mounting flange 69 and threading the same into one of the tapped holes 89 in the channel piece flanges.

Figure 16:
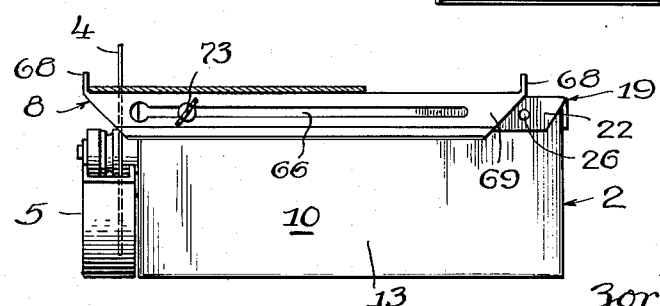
FIG. 16 is an end view of the carriage plate inverted from its normal or slidable position and anchored instead to the storage box so that either of the guide flanges may act as a stationary rip fence for the material shown in section.

For some applications it may be convenient to utilize a stationary rip fence. For this purpose, the carriage plate is inverted from its usual position so that the guide flanges 68—68 thereof may act as a rip fence. This use of the carriage plate is shown in FIG. 16. As there shown, the mounting flange 69 of the carriage plate extends down along the end cover flange 22. After the plate 8 is positioned to provide the proper spacing between one of the guide flanges 68 and the cutting blade 4, the plate is anchored in position by a shouldered screw 73 passing through the mounting flange slot 66 and threading into one of the cover flange holes 26.

Tilt stand

Where the work piece is a relatively heavy and long member, it may be difficult to perform a mitering operation while holding the work piece at an angle to the horizontal. In such case, it is desirable that the work support of the miter fixture be in a horizontal plane so that both ends of the work piece may be supported for sliding movement. For this purpose, the tilt stand 6 is utilized. As shown in FIGS. 17 and 18, the tilt stand is a U-shaped metal rod having a piece of rubber tubing 115 slipped over the rod in position about the cross piece thereof. The legs of the stand are extended through the holes 16—16 formed in the bottom of the box body 10. The stand legs are dimensioned so that the tips of the stand legs in contacting the upper corner of the storage box defined by the cover and the longitudinal side wall of the box body on the motor-containing side thereof will sturdily support the storage box at an angle of 45°. Then, when the miter fixture 9 is mounted on the carriage plate, the work support surface of the miter fixture will be in a horizontal plane, as best shown in FIG. 18.

Figure 20:
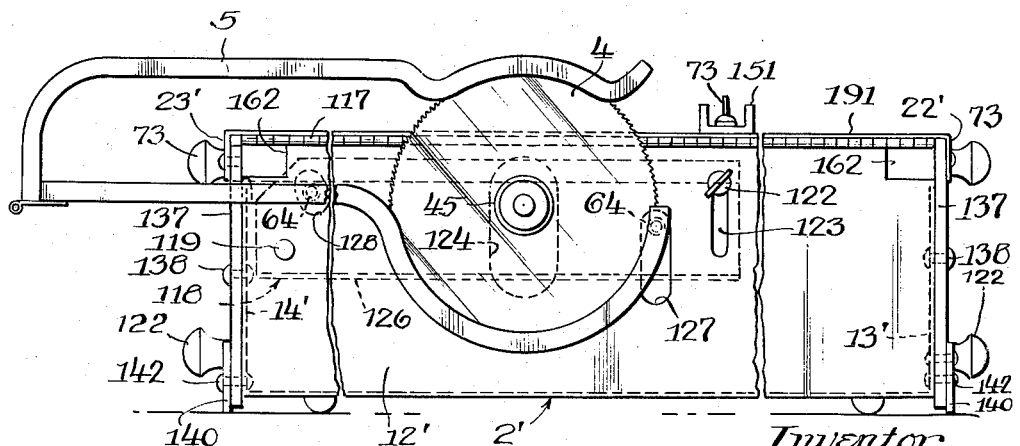
FIG. 20 (Sheet 5) is a side elevation of the tool box of FIG. 19.

Modification illustrated in FIGS. 19 through 21

There are numerous occasions where it is necessary to miter at angles differing from 45°, and further wherein a gradual adjustment of the depth of cut is desired without requiring a change of the saw blade. A portable tool box assembly having such features is shown in FIGS. 19 through 21. In this embodiment of the invention, the motor 3 is mounted in a storage box body 2' and a cover 19' is provided which is hinged at 117 to the box body along substantially the entire length of its long side (see FIG. 20), to minimize lateral wobbling of the cover with respect to the box body and to aid in stiffening the assembly.

Refer now particularly to FIG. 20. The motor 3 is carried by an L-shaped mounting bracket 118 which is pivotally mounted to a longitudinal wall 12' of the box body by a rivet 119 passing through the box body wall 12' and the upstanding wall 121 of the motor mounting bracket and making a working fit with the bracket. The bracket can be locked in any one of its adjusted positions by means of a shouldered thumb screw 122 passing through a clearance slot 123 formed in the box body wall 12' and threading into a tapped hole in the upstanding wall 121 of the motor mounting bracket. Clearance is provided for the movement of the tool-carrying arbor 45 by a slot 124 formed in the box wall 12'. The tool guard 5 should preferably move with the motor 3 and the guard mounting screws 64—64 are accordingly passed through clearance slots 127 and 128 formed in the box body wall 12' and threaded into tapped holes in the upstanding wall of the motor mounting bracket. Thus, to vary the depth of cut, the thumb screw 122 is loosened and the motor mounting bracket 118 is pivoted into the position which produces the required depth of cut. The screw 122 is then tightened to securely lock the motor mounting bracket in place.

The motor mounting bracket 118 has a horizontal platform or leg 126 which seats the motor 3. To accurately position the motor shaft axis at right angles to the length of the storage box, the platform 126 of the motor mounting bracket is provided with nipples 38'—38' (FIGS. 19 and 21) which fit very closely within correspondingly sized and located sockets formed in the flat bottom of the motor casing 3. The motor casing is held over the sockets by a pair of short thumb screws 73—73 which pass through oversized holes 125—125 in the platform 126 of the mounting bracket and thread into tapped holes in the motor casing. It is apparent that the nipples 38'—38' determine the location of the motor casing rather than the aforementioned holes in the motor casing and mounting bracket leg.

The box cover 19' has a flat top 21' from which depend end flanges 22' and 23' which, in the closed position of the cover, extend outwardly a small distance of the end walls 13' and 14' of the box body. A slightly inclined slot 129 is formed in each cover end flange for reasons to be explained. The cover 19' also has a longitudinal flange having an upturned bottom edge which provides a longitudinal open top channel 130. A longitudinal flange is omitted from the other long side of the cover 19' bearing the cover hinge 117.

The cover hinge 117 is a piano-type hinge and includes a hinge plate 132 secured to the bottom face of the cover top adjacent to the last-mentioned edge of the cover. The hinge plate 132 has spaced hinge eyelets positioned between hinge eyelets extending from a hinge plate 134 secured to the inner face of the longitudinal wall 12' of the box body.

The tops of the end walls 13' and 14' of the box body 2' are spaced below the top of the longitudinal walls 12'—12' a distance approximately equal to the width of the cover end flanges 22'—23' for reasons to be explained.

As above stated, the embodiment of FIGS. 19 through 21 provides for the gradual adjustment of the mitering angle. This is obtained in part by a mounting stand or frame assembly which includes a pair of struts 137—137 which are pivoted intermediate of their ends to the end walls 13' and 14' of the box body by rivets 138—138 passing through the struts and through the end walls 13' and 14' and making a working fit therewith. The axis of the rivets 138 are in alignment and parallel with the cover hinge axis.

Referring now particularly to FIGS. 19 and 20, the upper ends of the struts 137—137 contact the inner faces of the cover end flanges 22'—22'. Shouldered thumb screws 122—122 pass through the slots 129 in the cover end flanges and thread into tapped holes in the upper ends of the struts. The inclination, size and location of the cover flange slots 129—129 are such that the shanks of the screws 122—122 slide within the latter slots from end to end between the fully open and fully closed positions of the cover.

The bottom ends of the struts 137—137 are pivotally secured to corresponding ends of a pair of horizontally disposed support legs 140—140 by thumb screws 122—122 which pass through holes in the support legs and thread into tapped holes in the bottom of the struts. The bottom right hand end of the storage box body as viewed in FIG. 21 is movably secured to the support legs 140—140 by rivets 142—142 which pass through longitudindal inclined slots 143—143 in the support legs and through holes in the end walls 13' and 14' of the box body and make a working fit therewith so that the bottom of the box body is slidable along the support legs. When the box is in its closed position, the thumb screws 122—122 at the tops of the struts and the rivets 142—142 at the bottom of the box body lie, respectively, at the right hand ends of the slots 129—129 and 143—143. By then tightening the screws 122 at the ends of the struts, the cover is locked in its closed position. Rubber support buttons 141 may be used to support the storage box in its closed position. Where a 45° angle miter cut is desired, the latter screws are loosened and the struts are pivoted into position such that the upper screws 122 are at the left extreme end of the cover slots 129—129. The support leg slots 143—143 are so positioned, sized and angled that the rivets 142—142 then lie at the left hand end of the latter slots while the box body 2' is inclined at a 45° angle and the cover top is in a horizontal plane. The screws at the ends of the struts are then tightened to lock the storage box assembly in position. The plane of the cover is then at an angle of 45° to the axis of the motor shaft. By positioning the upper end of the struts 137—137 in positions intermediate the ends of the cover slots 129—129, the angle between the motor axis and the top of the cover may be adjusted between zero and 45°. In any case, the design of the structure is such that the top of the cover remains in a horizontal position as the angle of the storage box body varies with respect to the horizontally placed support legs 140—140.

To obtain mitering angles between 45 and 90°, it is only necessary to adjust the angle between the motor axis and the cover top to the desired angle less 45°, and then place the miter fixture 9 on a work support carried on the cover, as previously described.

The cover 19' is designed to slidably direct and support at least two different types of work supports. The work support shown on the cover in FIG. 21 is a carriage plate 8' similar to that described in connection with the embodiment of FIG. 1. It differs from the latter in that it has only one guide flange 68' which is formed by providing a fold along one edge of the carriage plate. The guide flange 68' is designed to form a working fit within the channel 130 formed in the cover longitudinal flange 24' while the top of the carriage plate rests on the top of the cover of the storage box. The work piece is held in place on the carriage plate and moved into contact with the saw blade 4 in the same manner as in the previously described embodiment of the invention.

Figure 22:
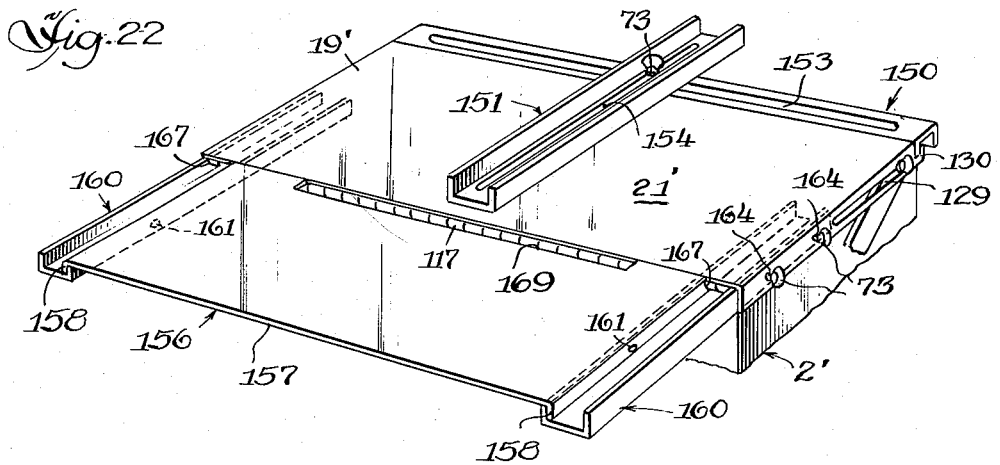
FIG. 22 is a perspective fragmentary view of the top of the tool box assembly of FIG. 19 with an extension table secured in place on the storage box cover and the saw blade removed.

The other type of work support is shown in FIGS. 19, 20 and 22. This work support is comprised of a pair of channel pieces 150—151 having longitudinal slots 153 and 154 formed in the webs thereof. The channel piece 150 has flanges which are sized to be slidable within the guide channel 130 of the cover 19'. The depth of each channel flange is equal to the spacing between the cover top and the bottom of the channel so that the top of the web of the channel piece 150 will be flush with the top of the cover when supported in the cover guide channel 130. The other channel piece 151 is inverted with respect to the channel piece 150 so that the webs of the channels are in contact with one another. By overlapping the slots of the channel pieces, a shouldered screw 73 can be passed through the slots and the channel piece 151 locked in any angular position with respect to the channel piece 150 by tightening a nut 156 threaded over the screw end. With the channel piece 151 positioned in the desired angle, a work piece to be cut is supported against the flange of the channel piece 151 closest to the saw blade 4; and the assembly of the channel pieces 150 and 151 and the work piece may be manually moved to feed the work piece against the saw blade.

*Extension table*

Referring now to FIG. 22, the machine tool apparatus of FIGS. 19 and 20 is there provided with an extension table 156 which is sized to fit within the storage box 2' when not in use. The extension table 156 provides support for the cut-off work piece and thus frees both hands of the operator for guiding the work into contact with the saw blade. The work table has a flat top 157 from which depend a pair of narrow flanges 158. The flanges straddle the inner flanges of a pair of extension table support channels 160—160 and are secured thereto by screws 161—161. The support channels extend through rectangular openings 162—162 (FIGS. 20 and 24) formed in the upper corners of the longitudinal box body wall 12'. The outer flange of each channel 160—160 is provided with a pair of tapped openings which are placeable in registry with holes 164—164 provided in each cover end flange 22'. The support channels are secured in place by thumb screws 73—73 passing through the cover flange holes 164—164 and threading into openings in the channel flanges above referred to. The flanges of the channels 160—160 are each notched at 167 so that the channel flanges pass around the cover hinge 117. A slot 169 is formed in the edge of the extension table which faces the saw blade so that the saw blade may have clearance to extend between the extension table and the box cover 19'. The slot 169 has been purposely made considerably longer than the diameter of the saw blade 4 to permit movement of the saw blade 4 longitudinally of the cover should a traversible support be provided for the motor.

*Traversing motor support (FIGS. 23 and 24)*

Figure 23:
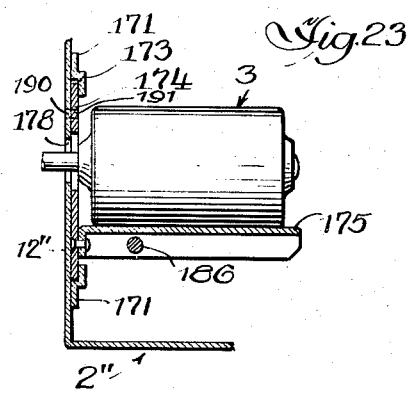
FIG. 23 shows a fragmentary section through a modified form of tool box construction where the motor is mounted for transverse movement within the storage box.
Figure 24:
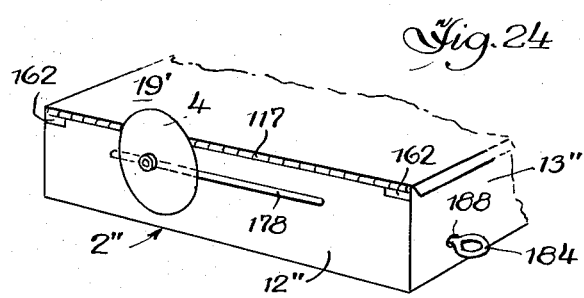
FIG. 24 is a perspective view of part of the box of FIG. 23.

Reference should now be made to FIGS. 23 and 24 which show a modified portable storage box 2" provided with a slidable motor mounting. As there illustrated, a pair of short offset pieces 171—171 are welded or otherwise secured to the longitudinal wall 12" of the box body 2". The pieces 171 are positioned to form guide channels 173—173. Slidable in the guide channel 173 is a motor support slide plate 174 having a motor support platform 175. The motor 3 is supported upon the support platform 175 in the same manner in which the motor 3 is supported upon the leg 126 of the motor mounting bracket in the embodiment of FIGS. 19 through 21. A horizontal slot 178 is formed in the longitudinal wall 12" of the storage box body 2" to provide clearance for the movement of the motor shaft along the length of the box.

When the motor is thus movably supported, it becomes necessary to anchor the work to the storage box cover. Where the carriage plate of FIG. 21 is utilized, this is accomplished by providing holes 180 and 181 respectively in the longitudinal cover flange 24 and the carriage plate flange 68' which holes are in registry when the carriage plate is positioned adjacent to one end of the cover. The carriage plate may then be locked to the cover by passing a bolt through these holes and threading a nut over the shank of the bolt. The same result may be accomplished for the work support of FIGS. 19 and 22 by forming a hole 181' through one or both of the flanges of the channel piece 150 and passing a bolt through the latter and the cover flange hole 180 and applying a nut to the bolt.

The saw blade 4 of this embodiment is drawn through the work piece which is then held stationary by the work support. The means for moving the motor may include a handle 184 (FIGS. 23 and 24) connected to the motor support platform 175 by a rod 186 extending through a hole 188 in the storage box wall 13".

If it is desired to anchor the motor support, a bolt is passed through holes 190—191 in the box wall 12" and the motor support slide plate 174, respectively.

It should be understood that numerous modifications may be made of the preferred embodiments of the invention above described without deviating from the broader aspects of the invention.

I claim:

1. A portable motor driven tool assembly comprising: a portable storage box having an open top body defining a storage space therein, and a cover for the top of the box body; a work support mountable on said cover; a motor; a tool-receiving arbor mounted on the motor shaft; and means for mounting the motor on the inside of the box cover so that the motor is within the box when the box is closed and with the arbor positioned to receive a tool at least partially outside of the box in cutting relation with a work piece on said work support, said mounting means including a saddle anchored to the bottom of the box cover, the motor being received within the saddle, locator means for accurately positioning the motor with respect to the cover, and screw means threaded into the bottom of said saddle for securely holding the motor against the cover.

2. A portable motor driven tool assembly comprising: a portable storage box having an open top box like body, a cover hinged to said body along a substantial portion of said cover's length, said cover serving as a work-supporting surface thereon, a motor supported for rectilinear movement parallel to the hinge center within the box, and a tool-receiving arbor operatively connected to and movable with the motor and carrying a tool extending at least partly above said work support surface and completely outside of the box with the axis of rotation of the arbor at right angles to the direction of rectilinear movement of the motor.

3. A portable motor-driven tool assembly comprising: a portable storage box having a flat work-supporting top surface, a motor supported for rectilinear movement within the box parallel to said work-supporting surface, means for selectively locking the motor against movement within the box, a tool-receiving arbor shaft operatively connected to and movable with the motor, said arbor positioned for supporting a tool entirely outside of the box in working relation with a work piece supported on the box top and with the axis of rotation of the tool at right angles to the direction of linear movement of the motor, work support means mountable on top of the storage box and providing an upstanding bracing wall, means for guiding the work and supporting same at an inclination to said arbor shaft and said work-supporting surface directing same downwardly below the box past the side of the box toward the tool for movement along the top of the storage box when the motor is locked in position, and means for locking the work support against movement on top of the storage box when the motor is free to move within the box.

4. A portable motor driven tool assembly comprising: a portable storage box having a flat rectangular top, a carriage plate which is mountable for sliding movement upon said flat box top for use as a work guide for cross cutting, said carriage plate having at least one longitudinal depending flange adapted to guide the carriage in a given direction along the top of the box by engaging a side of the top, the carriage having also an upstanding slotted flange extending at right angles to said longitudinal depending flange, fastening means for mounting said carriage in an inverted position upon said storage box top so that said longitudinal guide flange acts as a stationary rip fence, said fastening means cooperating with said slotted flange and said box top for adjustably locating said longitudinal flange in various transverse positions.

5. A portable machine tool assembly comprising: an oblong portable storage box having a flat upper surface; a motor mounted within said box and having a drive shaft which extends at right angles to the long dimension of the box; means for removably securing a rotary saw blade to the motor shaft with at least a portion of the saw blade extending above the top of the storage box; a work supporting carriage plate adapted to fit within the storage box and having a flat portion adapted to slide along the flat upper surface of said box, a depending guide flange for guiding the carriage in a direction at right angles to said motor shaft, and a back stop flange extending upwardly from said flat portion and extending in a direction at right angles to said guide flange, said back stop flange having a longitudinal slot terminating in an enlarged end; a miter fixture mountable upon said carriage plate; and a headed thumb screw threadable into said miter attachment through said stop flange slot, the head of said screw sized to pass through said enlarged end of said back stop flange slot and being larger in diameter than the width of the remainder of said back stop flange slot so that the miter fixture may be locked into any number of adjusted positions therealong.

6. A portable machine tool assembly comprising: a portable storage box having a flat upper surface; a motor mounted within said box; means for removably securing a rotary saw blade to the motor shaft with at least a portion of the saw extending above the top of the storage box; a work supporting carriage plate adapted to fit within the storage box and having a flat portion adapted to slide along the flat upper surface of said box, a depending guide flange for guiding the carriage in a direction at right angles to said motor shaft, and a back stop flange extending upwardly from said flat portion and extending in a direction at right angles to said guide flange, said back stop flange having a longitudinal slot; a miter fixture mountable upon said carriage plate; and a headed thumb screw threadable into said miter attachment through said stop flange slot, the head of said screw being larger in diameter than the width of the back stop flange slot so that the miter fixture may be locked into any number of adjusted positions therealong.

7. A portable motor driven tool assembly comprising: a portable storage box having an open top body defining a storage space therein, and a cover for the top of the box body; a work support mountable on said cover; a motor; a tool-receiving arbor mounted on the motor shaft; and means for mounting the motor on the inside of the box cover so that the motor is within the box when the box is closed and with the arbor positioned to receive a tool at least partially outside of the box, said mounting means including a saddle anchored to the bottom of the box cover, the motor being received within the saddle, locating nipples projecting inwardly from the bottom of the box cover, the motor having complementary sockets which fit snugly about said locating nipples to align the motor arbor transversely of the direction in which said work support is slidable on said cover, and screw means threaded into the bottom of said saddle for securely holding the motor sockets over said locating nipples.

8. A portable motor driven tool assembly comprising: a portable storage box having a cover; a movable work support; means for supporting the work support for sliding movement on said cover; a motor; a tool-receiving arbor mounted on the motor shaft; means for mounting said motor within said box with the motor arbor projecting from a side of the storage box, the arbor axis aligned transversely of the direction in which the work support is slidable on said cover, said mounting means including means fixed to one of said motor and storage box and providing locating nipples, means fixed to the other of same which means provide sockets which precisely fit about said locating nipples to position said arbor shaft accurately with respect to the direction of movement of said work support, and means for holding said nipples in said sockets.

9. A miter fixture comprising a pair of similar, spaced parallel side walls each having straight sides which are inclined with respect to other sides thereof, a bridging wall extending at right angles between a pair of corresponding sides of said side walls, a channel-shaped clamping piece having a web, the web having a length approximately equal to the spacing between said side walls, said channel piece having flanges etxending at right angles to the web, respective guide slots formed between said bridging wall and said side walls which guide slots slidably receive the flanges of said channel-shaped piece, and means for locking said channel in any one of a number of adjusted positions thereof, said locking means including tapped holes formed in said channel flanges, respective slots formed in said fixture side walls which are in the path of movement of the tapped holes in said channel flanges, and screw means having shanks passable through the slots of said fixture side walls and threadable into said tapped holes in said channel flanges.

10. A miter fixture comprising a pair of similar spaced parallel side walls each having straight sides which are inclined with respect to other sides thereof, a bridging wall extending at right angles between a pair of corresponding sides of said side walls, a channel-shaped clamping piece having a web, the web having a length approximately equal to the spacing between said side walls, said channel piece having flanges extending at right angles to the web, respective guide slots formed between said bridging wall and said side walls which guide slots slidably receive the flanges of said channel-shaped piece, and means for locking said channel in any one of a number of adjusted positions thereof.

11. A miter fixture comprising a pair of similar, spaced parallel side walls each having straight sides which are inclined with respect to other sides thereof, a bridging wall extending at right angles between a pair of corresponding sides of said side walls, a channel-shaped clamping piece having a web with a longitudinal slot therein, said bridging wall having a slot in registry with said web slot, the web having a length approximately equal to the spacing between said side walls, said channel piece having flanges extending at right angles to the web, respective guide slots formed between said bridging wall and said side walls which guide slots slidably receive the flanges of said channel-shaped piece, and means for locking said channel in any one of a number of adjusted positions thereof, said locking means including tapped holes formed in said channel flanges, respective slots formed in said fixture side walls which are in the path of movement of the tapped holes in said channel flanges, and screw means having shanks passable through the slots of said fixture side walls and threadable into said tapped holes in said channel flanges.

12. A portable machine tool assembly comprising: a portable storage box having a flat upper surface, a motor mounted within said box and having a tool-receiving arbor accessible from outside of the box, a cutting tool mounted on the arbor outside of the box; a carriage plate sized to fit within the box and slidable along the top of the box in a direction at right angles to the axis of the motor arbor, said carriage plate having an upstanding flange with a longitudinal slot therein; and a miter attachment mountable on top of said carriage plate and securable to said flange by screws passing through said flange slot and threadable into the miter fixture, said miter fixture comprising a pair of similar, spaced, parallel side walls each having the general outline of a right angle isosceles triangle, a bridging wall extending at right angles between corresponding sides of said side walls, said bridging wall having a slot extending the entire width of said bridging wall and merging with shallow slots formed in said side walls which shallow slots are a continuation of the slot in said bridging wall, a second bridging wall extending at right angles between another pair of corresponding sides of said side walls, a channel-shaped piece having a web of approximately the length of said second bridging wall and flanges extending at right angles to the web, respective guide slots formed between said second bridging wall and said side walls which guide slots slidably receive the flanges of said channel-shaped piece, said channel flanges each having a pair of tapped holes, a slot formed in each of said fixture side walls which are in the path of movement of a tapped hole in the adjacent channel flange as the channel is extended or retracted within said guide slots, the other tapped hole in each channel flange positioned to be in registry with said carriage plate flange slot when the miter fixture is placed on its side on top of the carriage plate, both the web of said channel and said second bridging wall having aligned slots therein, and said first-mentioned bridging wall and said side walls of said miter fixture having threaded holes positioned to be in registry with said carriage plate flange slot respectively when said miter fixture side walls and first-mentioned bridging wall rest upon said carriage plate.

13. A portable machine tool assembly comprising: a portable storage box having a flat upper surface, a motor mounted within said box and having a tool-receiving arbor accessible from outside of the box, a cutting tool mounted on the arbor outside of the box; a carriage plate sized to fit within the box and slidable along the top of the box in a direction at right angles to the axis of the motor arbor, said carriage plate having an upstanding flange with a longitudinal slot therein; and a miter attachment mountable on top of said carriage plate and securable to said flange by screws passing through said flange slot and threadable into the miter fixture, said miter fixture comprising a pair of similar, spaced, parallel side walls each having the general outline of a right angle isosceles triangle, a bridging wall extending at right angles between a pair of corresponding sides of said side walls, a channel-shaped piece having a web of approximately the length of said bridging wall and flanges extending at right angles to the web, respective guide slots formed between said bridging wall and said side walls which guide slots slidably receive the flanges of said channel-shaped piece, said channel flanges each having a pair of tapped holes, a slot formed in each of said fixture side walls which are in the path of movement of a tapped hole in the adjacent channel flange as the channel is extended or retracted within said guide slot, and the other tapped hole in each channel flange positioned to be in registry with said carriage plate flange slot when the miter fixture is placed on its side on top of the carriage plate.

14. Apparatus of the class described comprising a carriage member having a slotted upstanding wall serving as a miter fixture support, a triangular prismoidal miter fixture attachable to said upstanding wall having at least four substantial flat side walls, two of which are parallel spaced apart triangles, on which the fixture can be selectively supported against said upstanding wall, the relative positions of said side walls being such that each may serve as an inclined oblique work-supporting surface when the fixture is supported on one of the other side walls, a clamping channel supported on the miter fixture for movement toward and away from one of said miter fixture walls, and means for locking said channel into any one of a number of adjusted positions thereof, the clamping channel being removable from the miter fixture and mountable on the upstanding wall of said fixture support in a position where the web thereof extends at right angles to said upstanding wall to form a side gauge.

15. Machine tool apparatus comprising a miter fixture support having an upright mounting flange with a slot therein, a triangular prismoidal miter fixture having at least four substantial flat side walls, two of which are parallel spaced apart triangles, on which the fixture can be selectively supported against said upright mounting flange, the relative positions of said side walls being such that each may serve as an oblique work supporting surface when the fixture is supported on one of the other side walls, and said fixture walls having respective threaded holes therein which are positioned to respectively be in registry with said mounting flange slot in the various positions in which said fixture may be supported upon said support against said flange.

16. A guard for an abrasive wheel, a circular saw blade, or the like, comprising: an upper and lower narrow, channel-shaped, elongated piece hinged together at one end and spaced apart at the other end with the ends of the flanges of the channel pieces facing toward one another, the distal ends of said pieces being curved outwardly in opposite directions so as to extend around opposite sides of a rotatable tool element, the upper one of the curved ends terminating in an outwardly flaring camming lip so that the guard piece may be pivoted to permit a relatively thick work piece to pass between the latter guard piece and a rotating tool element on a work support surface, said curved ends of said guard pieces joining relatively long, straight, spaced-apart portions which provide clearance for a work piece fed past the machine tool element, the upper piece straight portion terminating in a downward bend to the point of a hinge connecting same with the lower piece, and the hinge pin of said hinged end being located below said work supporting surface to permit the upper piece to be automatically displaced upward, backward and downward, below the work surface, by a work piece of such length that it must otherwise be stopped by the back of the guard before the cut could be completed.

17. A portable motor driven tool assembly comprising: a storage box for carrying all of the elements making up the motor driven tool assembly, the box having a flat upper surface across which a work piece may be moved, a motor mounted within the box and having a tool-receiving arbor on its shaft on which a cutting tool completely outside of the box may be mounted, the axis of the arbor being positioned so that the periphery of a cutting tool may extend beyond said flat surface of said box, means for guiding a work piece supported on said surface in a direction at right angles to the motor arbor axis, and a guard sized to fit within the tool box securable on the outside of the box, said guard being formed of two long pieces hinged at one end, said pieces being spaced apart except at their hinged ends, the distal ends thereof being formed to extend about opposite sides of the cutting tool, means for mounting said guard to the side of the box with one of the guard pieces being above and the other below said flat box surface, the uppermost guard piece terminating in an outwardly or upwardly extending camming lip which may be cammed out of the way by a relatively thick work piece, to permit the latter to pass between the cutting element and the uppermost guard piece.

18. A portable motor driven tool assembly comprising: a storage box for carrying all of the elements making up the motor driven tool assembly, the box having a flat upper surface across which a work piece may be moved, a motor mounted within the box and having a tool receiving arbor on its shaft on which a cutting tool completely outside of the box may be mounted, the axis of the arbor being positioned so that the periphery of a cutting tool may extend beyond said flat surface of said box, means for guiding a work piece supported on said surface in a direction at right angles to the motor arbor axis, a guard sized to fit within the tool box securable on the outside of the box, said guard being formed of two long pieces hinged at one end, said pieces being spaced apart except at their hinged ends, the distal ends thereof being formed to extend about opposite sides of the cutting tool, and means for mounting said guard to the side of the box with one of the guard pieces being above and the other below said flat box surface.

19. A portable motor driven tool assembly comprising: a storage box, a motor rigidly mounted in said box, means for mounting a tool on the motor shaft outside of the box, a work supporting carriage sized to fit within said box, means for mounting said carriage for sliding movement on the outside of said box in a direction at right angles to the motor shaft, a miter fixture on said carriage having a work mounting surface inclined with respect to the axis of rotation of said tool, and tilt support means for supporting said storage box at an angle to the horizontal, with said miter fixture work mounting surface extending in a horizontal plane, whereby relative long and heavy work pieces may be horizontally supported during a mitering operation.

20. A portable motor driven tool assembly comprising: a storage box, a motor attached to said box and sized to fit within the box, a tool-receiving arbor to be driven by the motor shaft, means for mounting a tool on said arbor outside of the box, a work support surface on said box which surface is inclined with respect to the motor shaft axis, means for moving a work piece supported on said work support surface in a direction at right angles to the motor shaft, and tilt support means for supporting said storage box at an angle to the horizontal such that said work support surface is in a horizontal plane, whereby a work piece of considerable length and weight may be conveniently held on said work surface during a mitering operation, said tilt support means being a U-shaped stand of a size to fit within the box, the legs of the stand extendible at an angle through holes in the bottom of the box.

21. A portable motor driven tool assembly comprising: a storage box, a motor attached to said box, a tool-receiving arbor to be driven by the motor shaft, means for mounting a tool on said arbor outside of the box, a work support surface on said box which surface is inclined with respect to the motor shaft axis, means for moving a work piece supported on said work support surface in a direction at right angles to the motor shaft, and tilt support means for supporting said storage box at an angle to the horizontal such that said work support surface is in a horizontal plane, whereby a work piece of considerable length and weight may be conveniently held on said work surface during a mitering operation.

22. A portable motor driven tool assembly comprising a storage box having a body portion defining a storage space therein and a cover pivotally mounted to said box body, said cover providing a work support, a motor, means for pivotally mounting said motor to said box body, means for locking said motor in any one of its adjusted pivotal positions thereof, means for mounting a tool on the motor shaft, with the cutting portions of the tool located completely outside of the box, means for imparting relative linear movement between a work piece on said cover and said motor, and tilt support means for selectively varying the angle between the box cover and the axis of rotation of said tool while maintaining said cover in a generally horizontal plane, whereby a mitering operation may be performed while the work piece is supported on a horizontal surface.

23. A portable motor driven tool assembly comprising: a storage box having a body portion defining a storage space therein and a cover pivotally mounted to said box body, said cover providing a work support, a motor, means for mounting said motor to said box body, means for mounting a tool on the motor shaft, with the cutting portions of the tool located completely outside of the box, means for imparting relative linear movement between a work piece on said cover and said motor, and tilt support means for selectively varying the angle between the box cover and the axis of rotation of said tool while maintaining said cover in a generally horizontal plane, whereby a mitering operation may be performed while the work piece is supported on a horizontal surface.

24. A portable machine tool assembly comprising a portable storage box having an open top body defining a storage compartment and a cover hinged to a top edge of said body, a motor, a tool-receiving arbor driven by the motor, means for mounting the motor and arbor on the box body with the arbor on the outside of the box body adjacent to the side thereof containing the cover hinge, a stand for the box including a pair of struts pivoted intermediate their ends to opposite sides of the box body about aligned axes extending parallel to the cover hinge axis, means permitting relative longitudinal and angular movement between the upper ends of said struts and said cover, said last-mentioned means including slots formed in said cover, and means secured to said struts which are slidable within said cover slots, a pair of horizontally disposed support legs extending laterally of the cover hinge axis on opposite sides of the storage box, means for pivotally connecting the bottom end of said struts respectively to the corresponding ends of said legs, means permitting relative angular movement between said struts and legs, said last-mentioned means including longitudinal slots in said legs, and means secured to the bottom of said box body which are slidable within said longitudinal leg slots, said cover slots and said leg slots extending at an angle which maintains the box cover in a horizontal position in any one of a number of different angular positions of said box body and stand, whereby the angle of cut in a work piece supported on said cover may be selectively varied, and means for locking said stand, box body and cover in any one of a number of adjusted positions thereof where the cover is supported in a horizontal plane.

25. A portable machine tool assembly comprising a portable storage box having an open top body defining a storage compartment and a cover hinged to a top edge of said body, a motor, a tool-receiving arbor driven by the motor, means for mounting the motor and arbor on the box body with the arbor on the outside of the box body adjacent to the side thereof containing the cover hinge, a stand for the box including a pair of struts pivoted intermediate their ends to opposite sides of the box body about aligned axes extending parallel to the cover hinge axis, means permitting relative longitudinal and angular movement between the upper ends of said struts and said cover, a pair of horizontally disposed support legs extending laterally of the cover hinge axis on opposite sides of the storage box, means for pivotally connecting the bottom end of said struts respectively to the corresponding ends of said legs, means permitting relative angular movement between said struts and legs, and means for locking said stand, box body and cover in any one of a number of adjusted positions thereof where the cover is supported in a horizontal plane.

26. A portable motor driven tool assembly comprising a portable storage box having an open top box body and a cover hinged to the box body, a motor attached to said body and having a tool-receiving arbor located at least in part outside said body adjacent to the hinged side of said cover, said cover constituting a work support surface on which a work piece may be held in operative relation with a tool supported by said arbor, a stand for supporting said box body, means for supporting said box body at a number of different angles with respect to a support surface, and means for supporting said cover in a horizontal plane for all of said angular positions of said box body.

27. A portable motor driven tool assembly comprising: a portable storage box having an open top box body and a cover hinged to the box body, a motor attached to said body and having a tool-receiving arbor located at least in part outside of said body adjacent to the hinged side of said cover, said cover constituting a work support surface on which a work piece may be held in operative relation with a tool supported by said arbor, a stand for supporting said box body, said box body being pivotally mounted upon said stand to provide for angular adjustment of the box body with respect to the surface on which the stand is to rest, and means interconnecting the stand and the cover for maintaining the cover in a horizontal plane for a number of angular positions of said storage box body.

28. A portable machine tool assembly comprising a storage box having an open top body defining a storage compartment and a cover hinged to a top edge of said body, a motor, a tool-receiving arbor driven by the motor, means for mounting the motor and arbor on the box body with the arbor on the outside of the box body adjacent to the side thereof containing the cover hinge, a stand for the box including a pair of struts pivoted intermediate their ends to opposite sides of the box body about aligned axes extending parallel to the cover hinge axis, means permitting relative longitudinal and angular movement between the upper ends of said struts and said cover, said last-mentioned means including slots formed in said cover and means secured to said struts which are slidable within said transverse cover slots, and means for locking said cover and struts in any one of a number of relative positions thereof where the cover is supported in a horizontal position on said stand.

29. A portable machine tool assembly comprising a storage box having an open top body defining a storage compartment and a cover hinged to a top edge of said body, a motor, a tool-receiving arbor driven by the motor, means for mounting the motor and arbor on one of the walls of the box body with the motor within the box and the arbor on the outside of the box body adjacent to the side thereof containing the cover hinge, a framing assembly adjustably linking said box and cover, as the cover is turned about its hinge connection with the box, said framing assembly including a pair of struts pivoted intermediate their ends to opposite sides of the box body about aligned axes extending parallel to the cover hinge axis, said struts slidably engaging said cover at their upper ends by means permitting relative angular and rectilinear movement between the upper ends of said struts and said cover, and means for locking said cover and struts in any one of a number of relative positions thereof whereby the cover is supported in a horizontal position and the assembly rests on the lower ends of said struts and a lower edge of said box.

30. A portable machine tool assembly comprising a storage box having an open top body defining a storage compartment and a cover for the box body, said cover constituting a work support surface for holding a work piece to be cut by a saw blade, a motor mounted in the storage box, a tool-receiving arbor operatively connected to the motor shaft and at least a part thereof extending outside of the storage box, a saw blade mountable on said tool-receiving arbor outside of the box, an extension table, means for securing said extension table to said cover with the extension table approximately in the same plane as the top of the cover, a recess in the extension table adjacent an edge of the cover defining with said edge a slot through which said saw blade may extend, and said saw blade and extension table being sized to fit within said storage box so that a self-contained portable machine tool assembly is provided.

31. A portable motor driven tool assembly comprising: a storage box having a bottom and side walls forming an open top body; a cover, for the top of the box body, serving as a work support surface substantially supported by and hinged to one side wall of said box body for a major part of its length; work guiding means on said work support surface; a motor having a tool receiving arbor mounted on its power take off shaft with a tool secured in operating position thereto, of which at least a portion extends outside the box and above the cover while the motor is completely within, said motor secured to a motor mounting piece; means providing guided relative linear motion parallel to the hinge axis between said work guiding means and motor mounting piece; means for removably mounting said motor to said mounting piece including nipples in one of said motor and motor mounting piece and sockets formed in the other of same which precisely fit about said nipples to position the axis of the tool receiving arbor accurately with respect to the line of relative movement between the work and the motor mounting piece and releasable means for holding said nipples in said sockets.

32. A portable motor driven tool assembly comprising: a portable storage box having an open top box-like body including two longitudinal side walls, two shorter end walls and a bottom wall; a cover supported by and hinged to one said side wall, along a substantial portion of its length, serving as a work supporting surface over said box; a motor supported for rectilinear motion within the box parallel to the hinge center line; a tool-receiving arbor, operatively connected to and movable with said motor, carrying a tool adjacent to and outside the side wall to which said cover is hinged, extending at least partly above said work support surface, with the axis of rotation of the arbor at right angles to the direction of linear movement of the motor.

33. Machine tool apparatus comprising a triangular prismoidal miter fixture attachable to an upstanding vertical flange provided on a carriage member, said fixture having at least four substantial walls of which two are work supporting parallelograms on intersecting planes set between two opposed and parallel triangular walls, and means for selective attachment of any one of said four walls to said flange so that one of said parallelograms can serve as an oblique work support with respect to a vertical plane parallel to said flange as well as to a horizontal plane.

References Cited in the file of this patent

UNITED STATES PATENTS

| Number | Name | Date |
|---|---|---|
| 73,814 | Lane et al | Jan. 28, 1868 |
| 221,804 | Gordon | Nov. 18, 1879 |
| 327,651 | Bradshaw | Oct. 6, 1885 |
| 453,893 | Smith | June 9, 1891 |
| 720,873 | Anson | Feb. 17, 1903 |
| 1,018,739 | Beugler | Feb. 27, 1912 |
| 1,380,707 | Fehrm | June 7, 1921 |
| 1,566,225 | Mills | Dec. 15, 1925 |
| 1,799,973 | Clark | Apr. 7, 1931 |
| 1,842,630 | Rodning | Jan. 26, 1932 |
| 1,864,840 | Lehner | June 28, 1932 |
| 1,993,219 | Merrigan | Mar. 5, 1935 |
| 2,020,216 | Sarac | Nov. 5, 1935 |
| 2,188,827 | Bradfield | Jan. 30, 1940 |
| 2,442,829 | Smith | June 8, 1948 |
| 2,478,828 | Larson | Aug. 9, 1949 |
| 2,497,217 | Hall | Feb. 14, 1950 |
| 2,697,458 | Cue | Dec. 21, 1954 |
| 2,697,460 | Barnett | Dec. 21, 1954 |
| 2,714,904 | Bolton | Aug. 9, 1955 |
| 2,742,063 | Bretthauer | Apr. 17, 1956 |
| 2,777,485 | Farrow | Jan. 15, 1957 |

FOREIGN PATENTS

| Number | Country | Date |
|---|---|---|
| 271,449 | Switzerland | Jan. 16, 1951 |
| 391,965 | Great Britain | May 11, 1933 |